June 16, 1964 L. W. HOPKINS 3,137,096
FLOWER POT LINER ASSEMBLY
Filed Feb. 7, 1962

INVENTOR
LOUISE W. HOPKINS
BY
*Pennie, Edmonds, Morton, Barrows & Taylor*
ATTORNEYS

# United States Patent Office 3,137,096
Patented June 16, 1964

3,137,096
FLOWER POT LINER ASSEMBLY
Louise W. Hopkins, % Bennett and Shepard,
250 Bellevue Ave., Upper Montclair, N.J.
Filed Feb. 7, 1962, Ser. No. 171,633
3 Claims. (Cl. 47—38)

This invention relates to liner assemblies for flower pots and the like. More particularly it relates to a replaceable liner assembly which is designed to fit closely within a flower pot to form a receptacle for a plant and has a special design which permits complete watering and aeration of the plant.

The liner assembly is particularly designed for use in a flower pot and is comprised of a body member having a side wall constructed substantially to conform to the shape of the inner wall of a flower pot thereby substantially defining a container for a plant. The body member is opened at least at its upper end and at least one channel is provided which has an open end substantially at said upper end. The channel extends from the upper end along the side wall substantially to the base of the assembly such that a portion of the channel partially defines the interior of the container. A plurality of orifices are formed in the channel portion to open into said container and an absorbent member forms the base of the assembly. It is also intended that a perforated member can be positioned above the absorbent member to support the plant and thereby substantially define the base of the container.

A preferred embodiment of the invention is described hereinbelow with reference to the drawing wherein.

Figure 1:
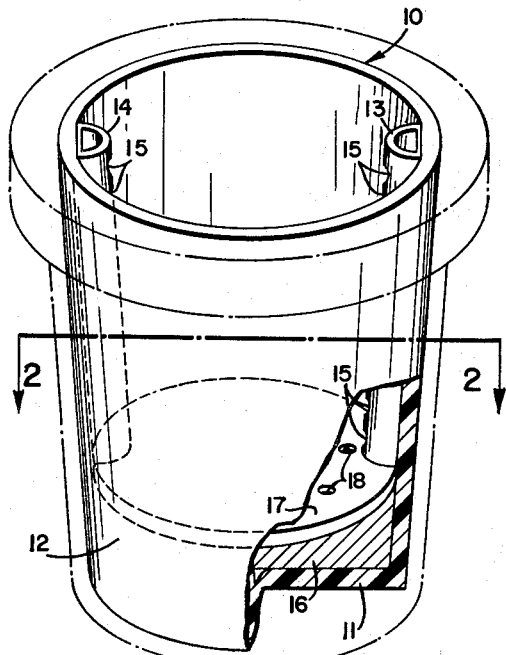
FIG. 1 is a perspective partly broken away of one embodiment of the liner assembly of the invention.

Referring initially to FIG. 1, the liner assembly is indicated as being positioned within a flower pot. A body member 10 of the liner assembly is essentially a cup-shaped member having an integral bottom portion 11 and a side wall 12. The body member 10 shown, has been cast or formed from a plastic material into a shape designed to fit into a standard flower pot. It is of course contemplated that any suitable material could be used. The body member 10 is open at the top portion in a similar manner as the ordinary flower pot and defines a container for a plant. As indicated, the outer surface of the side walls 12 will be positioned substantially flush against the inner wall of the flower pot. Two channels 13 and 14 which are closed along their longitudinal extension are positioned within the body member along diametrically opposed portions of the side wall 12 of the body member 10. Channels 13 and 14 are comprised of substantially elongated conduits and are positioned within the body member 10 such that they sit substantially flush against the side wall 12 and extend away from the side wall into the container to partially define the interior wall of the plant container. Spaced along the length of the channels 13 and 14 and opening into the body member 10 are a plurality of orifices 15.

Figure 2:
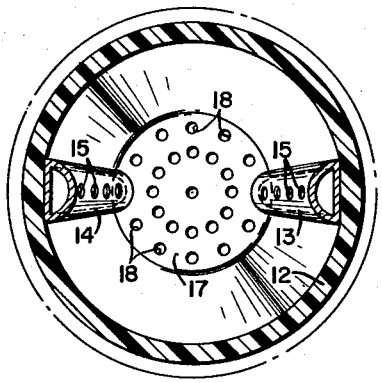
FIG. 2 is a section taken substantially along lines 2—2 of FIG. 1.
Figure 1A:
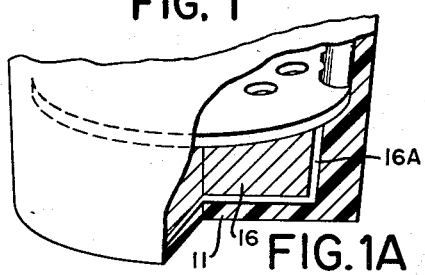
FIG. 1A shows a modified form of the liner assembly of FIG. 1.

A substantially cylindrical absorbent member 16, such as charcoal, is positioned on the bottom portion 11 of the body member 10. Overlying the absorbent member 16 is a perforated disc 17. The disc 17 is positioned within the body member 10 as shown in FIG. 2 with its peripheral edge fitted substantially flush against the side wall 12 to support the plant to be contained therein and thereby substantially define the base of a plant container. This disc can be supported by the charcoal 16 (FIG. 1), or separate supporting members can be provided on the body member 16a (FIG. 1A) to maintain the disc spaced from the charcoal. The disc 17 also has a plurality of holes 18 formed therein so as to promote circulation of water through the plant in the manner described below.

Figure 3:
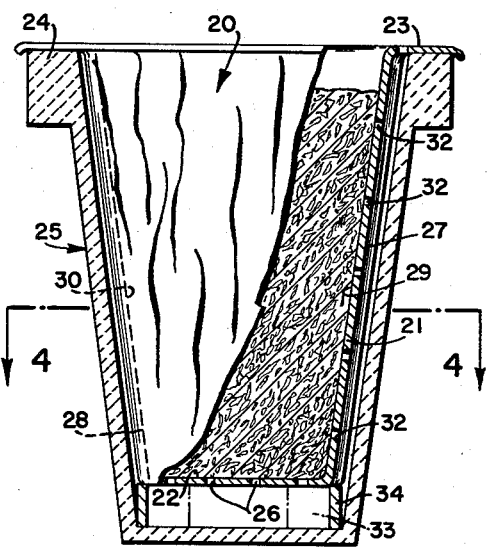
FIG. 3 is a sectional elevation of the second embodiment of the liner assembly.
Figure 4:
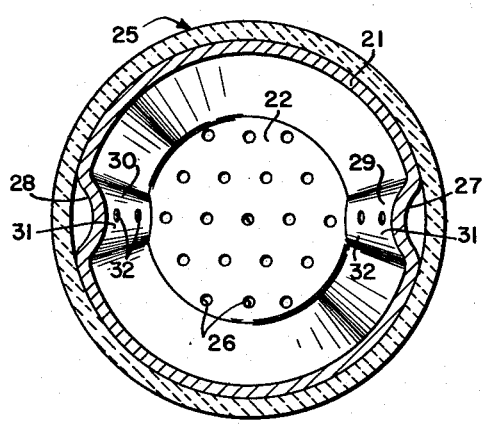
FIG. 4 is a slightly enlarged section taken substantially along the lines 4—4 of FIG. 3.

In FIGS. 3 and 4 the second embodiment of the invention is shown. A body member 20 is formed from aluminum foil. The body member 20 has side walls 21 and a perforated bottom 22 formed in a unitary construction, along with a flange 23 which extends outwardly from the upper portion of the body member 20 such that it will overlie a rim 24 of a flower pot 25. The flange 23 can advantageously be included on all such flower pot liners. By covering the rim of a flower pot with the flange 23, the leaves and stems of the plant are precluded from contact with the rim of the flower pot so as to obviate any possibility of killing these members of the plant by such contact. The bottom 22 is essentially the base of a container defined by the body member 20 and has perforations 26 formed therein to permit circulation of water therethrough. Two channels 27 and 28, as best seen in FIG. 2, are defined by side wall 21 being recessed inwardly away from the general shape of the body member such that they define longitudinally closed channels with the inner wall 31 of the flower pot 25 at substantially diametrically opposed positions. Thus, the recessed portions 29 and 30 serve to partially define the interior wall of the container for the plant. A plurality of orifices 32 are spaced longitudinally along the recessed portions 29 and 30 of the side wall 21.

An absorbent piece of charcoal 33 is positioned at the base of the flower pot 25 and serves to support the bottom 22 of the body member 20. As shown in FIG. 2 the absorbent charcoal 33 has an aluminum ring 34 around the outer periphery thereof. By providing a ring 34, a source is provided to supply certain minute additions of aluminum into the soil. The addition of a small deposit of aluminum has proven beneficial to the growth of certain plants such as African violets. The aluminum wrapped charcoal has been shown in FIG. 3 primarily for illustrative purposes since it ordinarily would be desirable to wrap the charcoal as described when there is no other source of aluminum present in the assembly. It has also been suggested that it may be advantageous to impregnate the charcoal with a beneficial plant food.

Although it would be preferable for the liner assembly to be pre-assembled and of various standard sizes to fit most standard size flower pots, it is also contemplated that the liner assembly could be marketed in a kit which would permit assembly by the consumer himself. This would be advantageous particularly for the formation of liner assemblies according to the invention where it is desired to provide a liner for an unusually shaped flower pot. Among the materials which it has been proposed to be included in such a kit are aluminum foil or a thermosetting resinous plastic. Aluminum foil is easily workable by hand and the thermosetting plastic could be heated and formed to the desired shape and then cooled after formation. Thus, the liner assembly formed from the kit could include a substantially cup-shaped body member, the bottom of which could be perforated to define the base of the plant container, or a separate perforated member could be included in the assembly spaced above the bottom of the body member and the charcoal. Alternatively the body member could be a substantially cylindrical member open at both ends which has been formed by joining the edges of a flat sheet of body material. Then the channels can be either formed as shown in FIGS. 3 and 4 by hand, or they could be included as separate elements as shown in FIGS. 1 and 2. Obviously, the charcoal member would also be packaged in such a kit as would a perforated disc if desired.

In use, any of the embodiments described would function the same. Referring to FIGS. 3 and 4 for purposes of description however, water may be poured into channels 27 and 28 causing the water to flow into the absorbent member 33 as well as through the orifices 32 and into the soil contained therein. Water in the base of the flower pot would be drawn through the absorbent charcoal member 33 upwardly through the apertures 26 formed in the bottom 22, thereby delivering purified water to the soil in the receptacle. As the water supply in the container decreases, the same orifices 32 in the channel members 27 and 28 provide means through which oxygen can be circulated into the soil, thereby further aiding the growth of the plant.

Thus, it is seen that a simply and cheaply constructed liner assembly is provided by the invention which can easily be inserted into a flower pot of various sizes and is disposable and replaceable without extensive cost.

I claim:

1. A flower pot assembly comprising a flower pot having a frusto-conical wall, a replaceable liner in the form of a plant container removably mounted in said flower pot, side liner comprising a body member open at its upper end
    (a) having a frusto-conical wall conforming in shape to the frusto-conical wall of said flower pot and lying substantially in overall surface contact therewith but free from attachment thereto,
    (b) and a bottom member integral with said side wall supported a substantial distance above the bottom of the flower pot, whereby a space is formed between said container bottom and the bottom of the flower pot,
    (c) at least one channel formed by said container wall being recessed inwardly away from the flower pot wall, said channel being open at its upper end and extending along said container wall to the container bottom,
    (d) a plurality of openings formed in the portion of said container wall defining said channel,
    (e) and a plurality of openings in the container bottom,
and an absorbent member of charcoal positioned in the space between the container bottom and the flower pot bottom.

2. The combination according to claim 1, in which the body member of the liner is formed with a flange extending outwardly from the upper end thereof and overlying at least a portion of the rim of the flower pot.

3. A combination according to claim 1, characterized in that aluminum is disposed about the charcoal.

References Cited in the file of this patent

UNITED STATES PATENTS

| | | |
|---|---|---|
| 126,112 | Von Levetzow | Apr. 23, 1872 |
| 608,664 | Free | Aug. 9, 1898 |
| 2,223,360 | Ellis | Dec. 3, 1940 |

FOREIGN PATENTS

| | | |
|---|---|---|
| 1,134,981 | France | Dec. 10, 1956 |
| 54,894 | Germany | Jan. 12, 1891 |
| 80,172 | Germany | July 19, 1894 |
| 361 | Great Britain | Feb. 9, 1859 |
| 288,141 | Great Britain | Sept. 13, 1928 |
| 497,409 | Great Britain | Jan. 19, 1939 |